(12) United States Patent
Heins

(10) Patent No.: US 6,733,636 B1
(45) Date of Patent: May 11, 2004

(54) WATER TREATMENT METHOD FOR HEAVY OIL PRODUCTION

(75) Inventor: William F. Heins, Redmond, WA (US)

(73) Assignee: Ionics, Inc., Watertown, MA (US)

( * ) Notice: Subject to any disclaimer, the term of this patent is extended or adjusted under 35 U.S.C. 154(b) by 0 days.

(21) Appl. No.: 09/566,622

(22) Filed: May 8, 2000

Related U.S. Application Data
(60) Provisional application No. 60/133,172, filed on May 7, 1999.

(51) Int. Cl.[7] .............................. B01D 1/28; B01D 3/42; C02F 1/04; C02F 9/00

(52) U.S. Cl. ..................... 203/1; 159/24.1; 159/47.1; 159/901; 159/45; 166/267; 166/272; 166/303; 203/10; 203/26; 203/98; 203/DIG. 16; 203/48; 210/664; 210/669; 210/805; 210/806

(58) Field of Search .................. 203/10, 1, 48, 203/27, 24, 26, DIG. 8, DIG. 16, 89, 98, 34–37; 122/441; 159/49, 901, 45, 44, 24.1, 48.1, 47.1, 26.1, DIG. 23, DIG. 20; 210/664, 669, 805, 806; 166/267, 272, 303

(56) References Cited

U.S. PATENT DOCUMENTS
| | | |
|---|---|---|
| 2,091,898 A | 8/1937 | Weber |
| 3,192,130 A | 6/1965 | Pottharst, Jr. |

(List continued on next page.)

FOREIGN PATENT DOCUMENTS
| | | |
|---|---|---|
| CA | 2274258 | 7/1998 |
| CA | 2274258 | 6/1999 |
| CA | 2305118 | 5/2000 |
| CA | 2345595 | 11/2001 |

OTHER PUBLICATIONS
S. Kok, A. Saidi, and R. Solomon, "Total Dissolved Solids Removal From Water Produced During The In Situ Recovery of Heavy Oil and Bitumen", Advances in Thermal Recovery, The Journal of Canadian Petroleum Technology, vol. 26, No.1, pp. 100–105, Jan., 1989.

(List continued on next page.)

Primary Examiner—Virginia Manoharan
(74) Attorney, Agent, or Firm—R. Reams Goodloe, Jr.

(57) ABSTRACT

A method of treating produced water from heavy oil production to provide feedwater for the production of high quality steam. A produced water from heavy oil recovery operations is initially treated by first removing oil and grease to a desired level, preferably to about twenty parts per million, or less. The pH is then adjusted, normally downward and by acid addition, to release at least some carbonate alkalinity as free carbon dioxide. Preferably, all non-hydroxide alkalinity is removed, or substantially so, by introducing the feedwater into a decarbonator. In some cases, the pH may be raised (without, or subsequent to decarbonation, depending upon water chemistry) preferably by caustic addition, to maintain silica solubility in the feedwater. Next the feedwater is introduced into an evaporator, and the feedwater is evaporated to a pre-selected concentration factor to produce (1) a distillate having a small amount of residual hardness therein, and (2) a concentrate containing residual solids (dissolved solids and in some cases, suspended solids). The distillate is then cooled, and is subsequently introduced into a hardness removal step, preferably an electrodeionization (EDI) treatment unit, to remove the residual hardness from the distillate. Finally, the substantially hardness free treated water stream is sent to packaged boilers, for production of high quality steam. The hardness containing stream from EDI is recycled to the evaporator feed, for further treatment.

27 Claims, 6 Drawing Sheets

U.S. PATENT DOCUMENTS

| | | | | |
|---|---|---|---|---|
| 3,586,090 | A | 6/1971 | Henderson | |
| 3,917,526 | A | 11/1975 | Jennings | |
| 3,933,576 | A | 1/1976 | Rushton | |
| 3,968,002 | A * | 7/1976 | Standiford | 159/13.2 |
| 4,030,985 | A | 6/1977 | Barba et al. | |
| 4,054,493 | A | 10/1977 | Roller | |
| 4,073,644 | A | 2/1978 | Papafingos et al. | |
| 4,083,781 | A | 4/1978 | Conger | |
| 4,090,916 | A | 5/1978 | Papafingos et al. | |
| 4,105,556 | A | 8/1978 | D'Amaddio et al. | |
| 4,260,461 | A * | 4/1981 | Pottharst, Jr. | 202/176 |
| 4,343,691 | A | 8/1982 | Minkkinen | |
| 4,344,826 | A | 8/1982 | Smith | |
| 4,370,858 | A | 2/1983 | Awerbuch et al. | |
| 4,391,102 | A | 7/1983 | Studhalter et al. | |
| 4,392,959 | A * | 7/1983 | Coillet | 210/638 |
| 4,398,603 | A | 8/1983 | Rodwell | |
| 4,444,680 | A | 4/1984 | Kitzes et al. | |
| 4,458,520 | A | 7/1984 | Adame et al. | |
| 4,472,355 | A | 9/1984 | Hickam et al. | |
| 4,474,011 | A | 10/1984 | Nelson et al. | |
| 4,548,257 | A | 10/1985 | Williamson | |
| 4,561,965 | A | 12/1985 | Minkkinen | |
| 4,576,627 | A | 3/1986 | Hughes | |
| 4,698,136 | A | 10/1987 | El-Allawy | |
| 4,706,749 | A | 11/1987 | Hayes et al. | |
| 4,877,536 | A | 10/1989 | Bertness et al. | |
| 4,913,236 | A | 4/1990 | Reed | |
| 4,967,837 | A | 11/1990 | Danzik | |
| 5,250,151 | A | 10/1993 | Huercanos | |
| 5,474,653 | A | 12/1995 | Bostjancic | |
| 5,587,054 | A | 12/1996 | Keith | |
| 5,683,587 | A | 11/1997 | Ferrara et al. | |
| 5,695,643 | A | 12/1997 | Brandt et al. | |
| 5,783,084 | A | 7/1998 | Suenkonis | |
| 5,858,177 | A | 1/1999 | Morris | |
| 5,932,074 | A | 8/1999 | Hoiss | |
| 5,968,312 | A * | 10/1999 | Sephton | 159/18 |
| 6,074,549 | A | 6/2000 | Bacon Cochrane et al. | |
| 6,186,232 | B1 | 2/2001 | Isaacs et al. | |
| 6,205,289 | B1 | 3/2001 | Kobro | |
| 6,355,145 | B1 | 3/2002 | Kresnyak et al. | |
| 6,365,005 | B1 | 4/2002 | Schleiffarth | |
| 6,375,803 | B1 | 4/2002 | Razzaghi et al. | |
| 6,536,523 | B1 | 3/2003 | Kresnyak et al. | |

OTHER PUBLICATIONS

R.L. Solomon, and K.E. Schooley, "Recycling Oil–Field Produced Waters Using Evaporation Technology", American Filtration Society, National Fall Meeting, Oct. 29–30, 1990, Baton Rouge, Louisiana. (11 pages including tables and Figures).

News Release Transmitted by Canadian Corporate News For: Aqua Pure Ventures, Inc., Oct. 14, 1998, CCN Home Page site Map, Mar. 03, 1999, (2 pages).

The Aqua Pure System: Pure Water Recovery, (Web Page); http:/www.aqua–pure.com, Mar. 03, 1999, (5 pages).

A Unique Mechanical Vapour Recompression / Distillation Process for Purifying Water, R.F. (BOB) Becker; Steve Kresnyak; Colt Engineering Corporation, Calgary, Alberta, Canada, Mar. 03, 1999, (9 pages).

Achieving Zero Liquid Discharge in the Heavy Oil Recovery Industry. W. Heins, Oil Sands Process Water Workshop, May 8, 2001, Fort McMurray, Alberta.

Bridge Over Troubled Water, Simplifying Water Purification for Increasingly Thirsty Oilsands Extractors, Maurice Smith, (Web Page);www.ntm.nickles.com/New Technology Magazine, Jul./Aug. 2001 (pp. 37–39).

Produced Water Recycyling At BF Resources—Petro Canada's Wolf Lake Plant. W. Zalewski; R. Averill; G. Arychuk, Mar. 14, 1991.

Achieving Zero Liquid Discharge in SAGD Heavy Oil Recovery, W. Heins and K. Schooley, Petroleum Society's Canadian International Petroleum Conference 2000; Calgary, Alberta, Jun. 11–13, 2002. (10 pages).

* cited by examiner

SAGD HEAVY OIL RECOVERY PROCESS

PHYSICAL-CHEMICAL TREATMENT FOR PACKAGED BOILER FEEDWATER

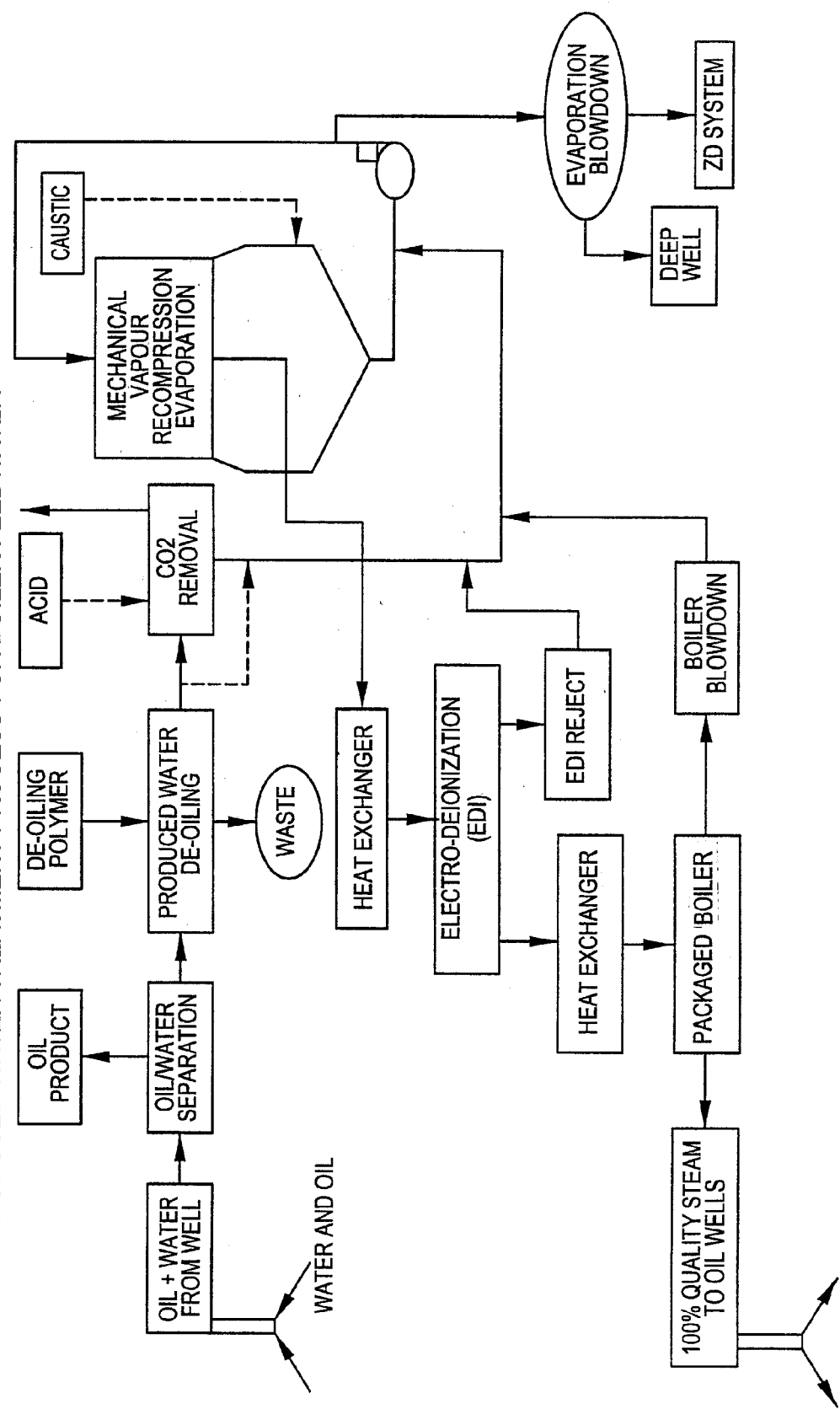

FIG. 5

TYPICAL BOILER FEEDWATER REQUIREMENTS FOR PACKAGED BOILERS

| | |
|---|---|
| Hardness | < 0.05 mg/l as CaCO3 |
| Non-volatile TOC | < 0.20 mg/l as C |
| Oil & Grease | < 0.20 mg/l as substance |
| pH | 8.8 to 9.6 |

FIG. 6

SILICA SOLUBILITY CHARACTERISTICS

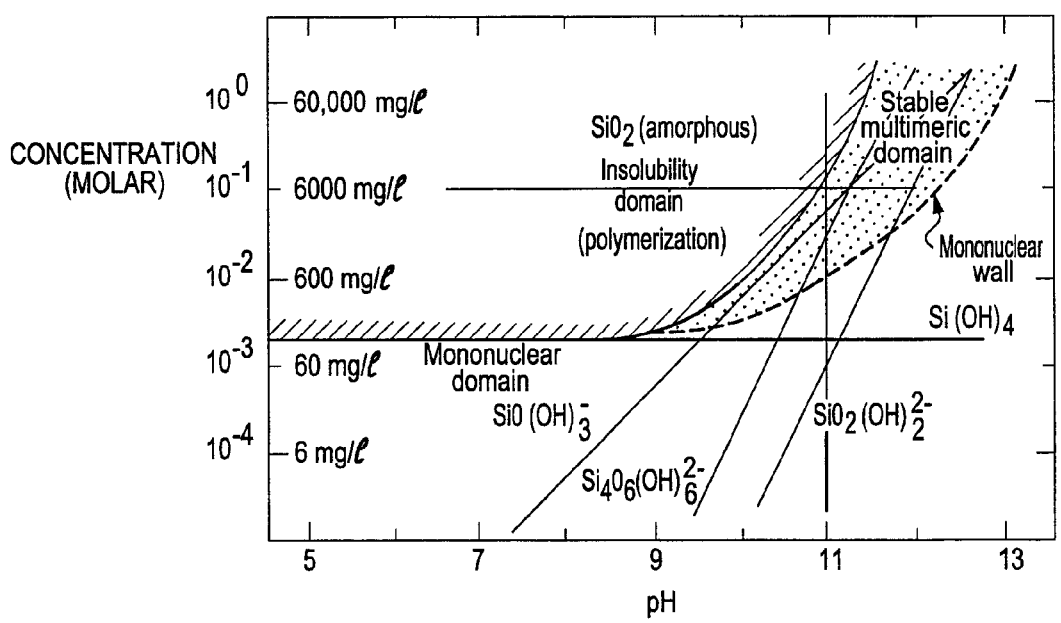

Note: Figure shows species which are in equilibrium with amorphous silica. The diagram is computed from equilibrium constants (25°C). The line surrounding the shaded area gives the maximum soluble silica. The mononuclear wall represents the lower concentration limit below which multi-nuclear silica species are not stable. In natural waters the dissolved silica is present as monomeric silicic acid.

SEEDED-SLURRY SCALE PREVENTION MECHANISM

WATER TREATMENT METHOD FOR HEAVY OIL PRODUCTION

This application claims the benefit of Provisional Application Ser. No. 60/133,172 filed May 7, 1999.

A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention is related to a novel process for treatment of water in operations for the recovery of oil from geological formations. More specifically, this invention relates to novel, improved techniques for the preparation of high quality water for down-hole use, and more specifically, for generation of steam for downhole use, in heavy oil recovery operations.

BACKGROUND

Water treatment is a necessary operation in heavy oil recovery operations. This is because in order to recover heavy oil from certain geologic formations, steam is required to increase the mobility of the oil in the formation. Traditionally, heavy oil recovery operations have utilized "once through" type steam generators. Such steam generators are most commonly provided in a configuration and with process parameters wherein about eighty percent (80%) quality steam is produced at about 1000 pounds per square inch (psig). The 80% quality steam (which is 80% vapor, 20% liquid, by weight) is injected via injection wells to fluidize the heavy oil. An oil/water mixture results, and the mixture is pumped to the surface. Then, the sought-after oil is separated from the water and recovered for sale.

The produced water stream, after separation from the oil, is further de-oiled, and is treated for reuse. Most commonly, the water is sent to the "once-through" steam generators for creation of more steam for oil recovery operations. The produced water stream is typically required to have less than about 8000 PPM TDS (as well as meeting other specific constituent requirements) for re-use. Thus, in most cases, the recovered water must be treated before it is sent to the steam generators. Normally, such treatment is initially accomplished by using a warm lime softener, which removes hardness, and which removes some silica. Then, an "after-filter" is often utilized, to prevent carry-over of any precipitate or other suspended solids. For polishing, in a hardness removal step, a weak acid cation (WAC) system is often utilized to simultaneously remove hardness and the alkalinity associated with the hardness. A schematic of such a typical prior art process is presented in FIG. 1.

A relatively new heavy oil recovery process, referred to as the Steam Assisted Gravity Drainage heavy oil recovery process (the "SAGD" process), ideally utilizes 100% quality steam for injection into wells (i.e., no liquid water). Initially, water utilized for generating steam in such operations can be treated much the same as in the just discussed traditional heavy oil recovery operations. However, in order to produce 100% quality steam using a once-through type steam generator, a series of vapor-liquid separators are required to separate the liquid water from the steam. The 100% quality steam is then sent down the well and injected into the desired formation. A typical process flow sheet for such a process is presented in FIG. 2.

Another method for generating the required 100% quality steam involves the use of packaged boilers. Various methods are well known for producing water of sufficient water to be utilized in a packaged boiler. One method which has been developed for use in heavy oil recovery operations involves de-oiling of the produced water, followed by a series of physical-chemical treatment steps. Such additional treatment steps normally include such unit operations as warm lime softening, after-filtration, organic traps, pre-coat filters or ultrafiltration, reverse osmosis, and mixed bed demineralization. A typical state-of-the-art process flow scheme for utilizing packaged boilers in heavy oil recovery operations is shown in FIG. 3. Such a physical-chemical treatment system may have a high initial capital cost, and generally involves significant ongoing chemical costs. Moreover, there are many waste streams to discharge, involving a high sludge disposal cost. Further, where membrane systems such as ultrafiltration or reverse osmosis are utilized, relatively frequent membrane replacement is encountered, at significant additional cost. Also, such processes can be quite labor intensive to operate and to maintain. Therefore, it is clear that the development of a simpler, more cost effective approach to produced water treatment as necessary for packaged boiler make-up water would be desirable.

In summary, the currently known and utilized methods for treating heavy oil field produced waters in order to generate high quality steam for down-hole are not entirely satisfactory because:

- most physical chemical treatment systems are quite extensive, are relatively difficult to maintain, and require significant operator attention;
- they often require liquid-vapor separation equipment, which adds to equipment costs;
- a large quantity of unusable hot water is created, and the energy from such water must be recovered, as well as the water itself, in order to maintain an economic heat and material balance in plant operations;
- they require large amounts of expensive chemicals, many of which require special attention for safe handling, and which present safety hazards if mishandled;
- the treatment train produces fairly substantial quantities of undesirable sludges and other waste streams;
- the disposal of waste sludges and other waste streams is increasingly difficult, due to stringent environmental and regulatory requirements.

Thus, it can be appreciated that it would be advantageous to provide a new process which minimizes the production of undesirable waste streams, while minimizing the overall costs of owning and operating a heavy oil recovery plant.

OBJECTS, ADVANTAGES, AND NOVEL FEATURES

My novel water treatment process can be advantageously applied to heavy oil production operations. The method is particularly advantageous in that is minimizes the generation of waste products, and is otherwise superior to water treatment processes heretofore used or proposed.

From the foregoing, it will be apparent to the reader that one important and primary object of the present invention resides in the provision of a novel process for the treatment of produced waters, so that such waters can be re-used in heavy oil recovery operations.

Another important objective of my process is to simplify the processing procedures, which importantly, simplifies operations and improves quality control in the manufacture of high purity water for down-hole applications.

Other important but more specific objects of the invention reside in the provision of an improved water treatment process for production of high purity water for down-hole use, as described herein, which:

eliminates the requirement for separation of hot liquids from generated steam;

eliminates the generation of softener sludges;

in conjunction with the just mentioned object, minimizes the production of undesirable waste streams;

minimizes operation and maintenance labor requirements;

minimizes maintenance materiel requirements;

reduces the capital costs for water treatment equipment in heavy oil operations;

virtually eliminates chemical additives and associated handling requirements.

Other important objects, features, and additional advantages of my invention will become apparent to the reader from the foregoing and from the appended claims and the ensuing detailed description, as the discussion below proceeds in conjunction with examination of the accompanying drawing.

SUMMARY

I have now invented, and disclose herein, an improved water treatment process for heavy oil recovery operations. This process minimizes or eliminates waste streams which must be sent for off-site disposal of liquids or sludges, and otherwise does not have the above-discussed drawbacks common to heretofore-utilized water treatment techniques of which I am aware. Importantly, my novel process overcomes the heretofore-encountered shortcomings of water handling in heavy oil recovery operations. Also, it eliminates undesirable multiplicity of treatment steps and unit operations seen in the more commonly utilized alternative water treatment processes. Thus, it is believed that my novel water treatment process will substantially simplify water treatment preparatory to steam generation in heavy oil recovery operations. My method involves producing steam from a selected feedwater, by first removing oil and grease to desired level, preferably to about twenty parts per million, or less. Then, the pH is adjusted, normally downward and by acid addition, to release at least some carbonate alkalinity as free carbon dioxide. Preferably, all non-hydroxide alkalinity is removed, or substantially so, by introducing the feedwater into a decarbonator, wherein said free carbon dioxide is substantially removed. Next the feedwater is introduced into an evaporator, and the feedwater is evaporated to a pre-selected concentration factor to produce (1) a distillate having a small amount of residual hardness therein, and (2) a concentrate containing residual solids (dissolved solids and in some cases, suspended solids). The distillate is then cooled, and is subsequently introduced into a hardness removal step, preferably an electrodeionization (EDI) treatment unit, to remove the residual hardness from the distillate. Finally, the substantially hardness free treated water stream is sent to packaged boilers, for production of high quality steam.

BRIEF DESCRIPTION OF THE DRAWING

FIG. 4 is a process flow diagram of my novel process for treatment of produced water in heavy oil recovery operations.

FIG. 5 shows the typical feedwater quality requirements for 1000 psig packaged boilers which may be advantageously utilized in produced water heavy oil recovery operations by using my novel water treatment process.

FIG. 6 illustrates the solubility of silica as a function of pH.

DESCRIPTION

Figure 1:
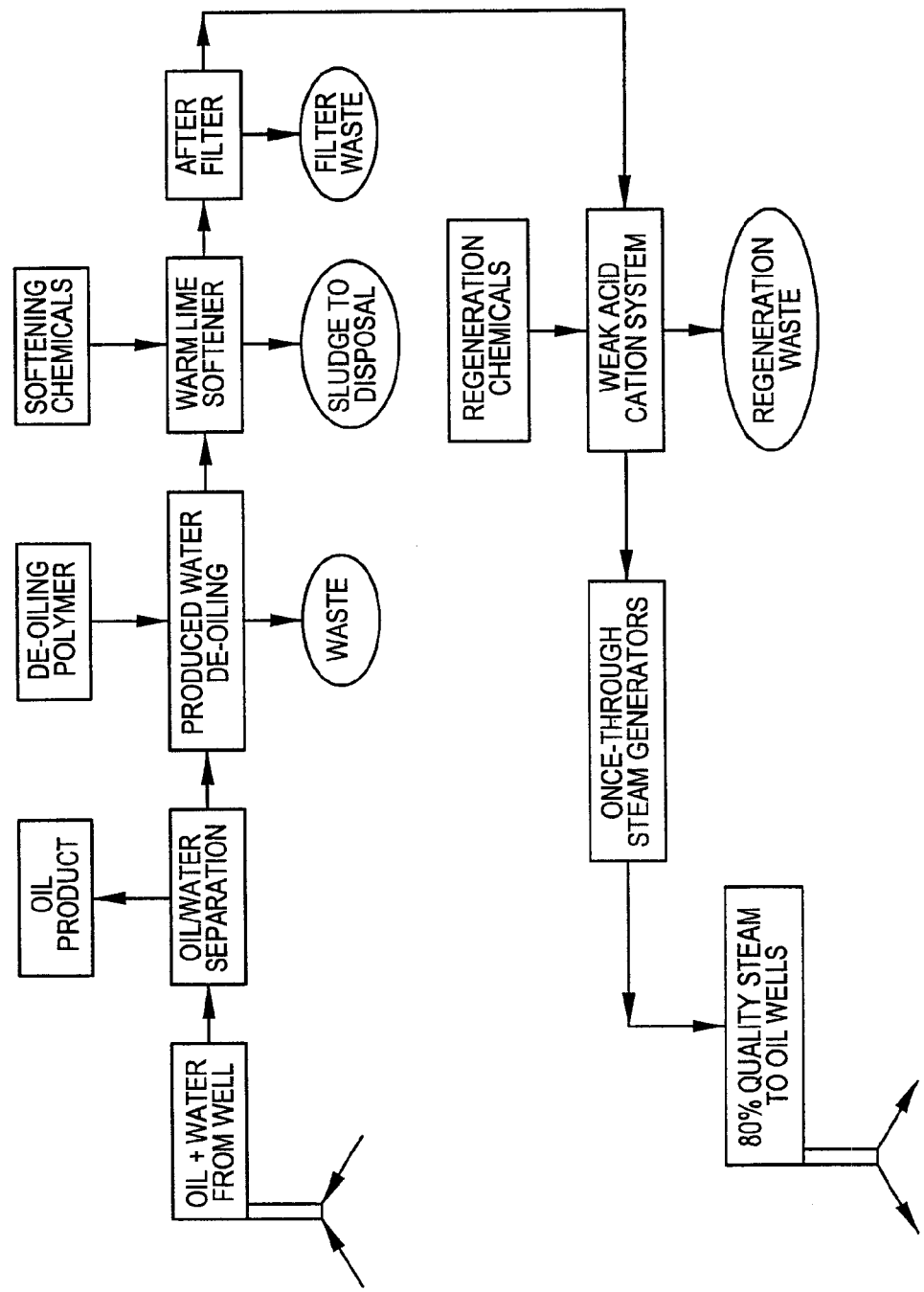
FIG. 1 generalized process flow diagram for water treatment in prior art heavy oil recovery operations.
Figure 2:
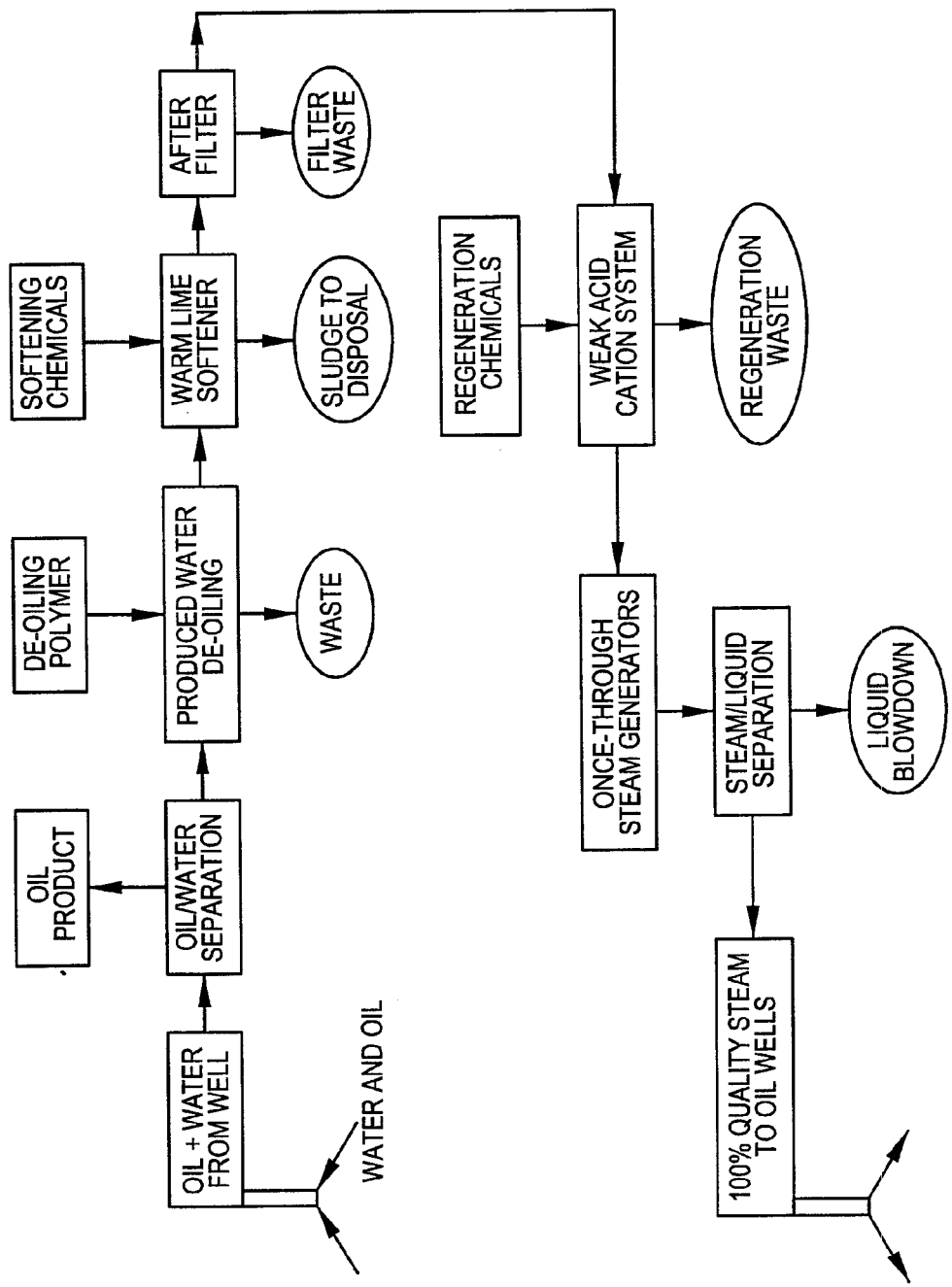
FIG. 2 is a generalized process flow diagram for the state of the art water treatment process in steam assisted gravity drainage (SAGD) type heavy oil operations.
Figure 3:
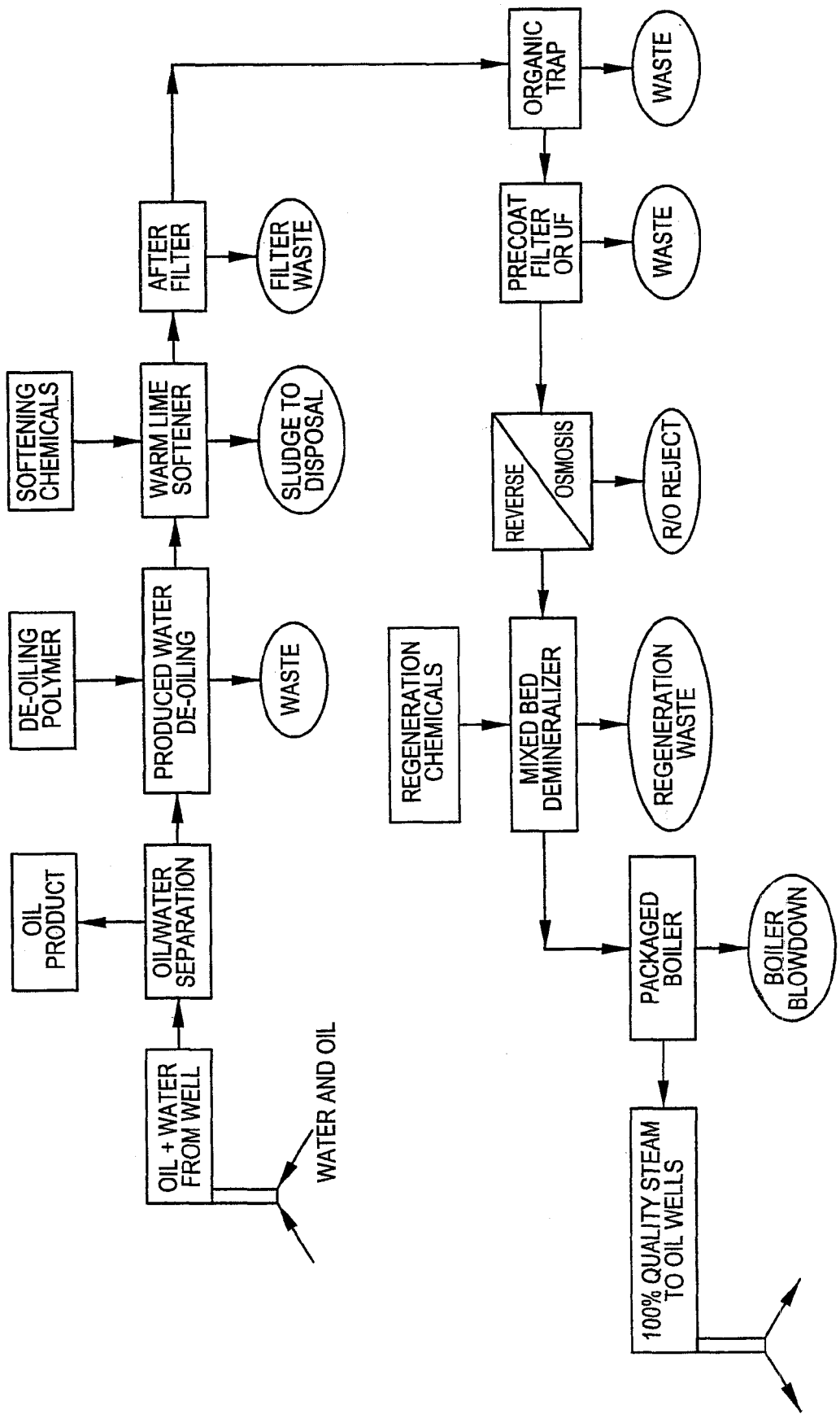
FIG. 3 is a generalized process flow diagram for one alternative water treatment process for use in steam assisted gravity drainage (SAGD) type heavy oil operations.

Since the steam assisted gravity drainage (SAGD) heavy oil recovery process utilizes 100% quality steam, it may be desirable in some instances to use a standard packaged boiler to produce the required steam, rather than to utilize a traditional once-through type steam generator. It is noteworthy in such an evaluation that packaged boilers are less expensive on a capital cost basis than once-through type oil-field steam generators. Also, package boilers are commonly utilized to produce pure steam, and thus produce only a minimal liquid blowdown stream. Unfortunately, packaged boilers require a much higher quality feed water than a once-through type steam generator. As a result, a very different approach to feedwater pretreatment (i.e., pretreatment of the produced water generated following the oil/water separation) has now been developed an alternative method for produced water treatment. My new water treatment method utilizes a mechanical vapor recompression evaporation step, followed by removal of hardness from the pure distillate produced by the evaporator. While hardness removal can be accomplished by an ion exchange system, a preferred method of hardness removal employs an electrodeionization (EDI) step. This novel combination of process treatment steps treats an oil and water mixture gathered from an oil and water collection well, and ultimately produces feedwater of sufficient quality, and in economic quantity, for use in packaged boilers in heavy oil recovery operations. The gathered oil and water mixture is separated into an oil product and a produced water having residual oil therein. The produced water is de-oiled to provide an evaporator feedwater having dissolved solutes (including silica) and dissolved gases therein. The evaporator feedwater is heated to remove at least some of the dissolved gases, and in most cases, acidification of the feedwater prior to heating can be practiced to remove carbonates. The feedwater is injected into a circulating brine in an evaporator having a plurality of heat transfer surfaces. The circulating concentrated brine is raised to or maintained at a sufficiently high pH to maintain the solubility of silica in the circulating brine. The circulating brine is distributed on a first surface of at least one of a plurality of heat transfer surfaces, to generate a steam vapor. The steam vapor is compressed to produce a compressed steam vapor, which is directed to a second surface of at least one of a plurality of heat transfer surfaces to condense the compressed steam vapor and to form a distillate having residual solutes therein. A portion of the circulating brine is discharged as an evaporator blowdown stream. The distillate is treated via electrodeionization treatment or by ion exchange treatment to produce a substantially solute free distillate stream and a solute containing reject stream. The distillate can be cooled prior to introduction into the electrodeionization or ion-exchange system, if necessary. The treated distillate is introduced into a steam boiler to produce steam and a boiler blowdown stream containing water and residual solids. The boiler blowdown stream can be returned to the evaporator for treatment. The steam may be produced as either 80% quality or in packaged boilers as 100% quality, and in either case, the steam is injected via injection wells to fluidize heavy oil. A schematic of my novel process is presented in FIG. 4.

Importantly, this new process method (1) eliminates many physical-chemical treatment steps commonly utilized in handing produced water, (2) results in lower capital equipment costs, (3) results in lower operating costs for steam generation, (4) eliminates the production of softener sludge, thus eliminating the need for the disposal of the same, (5) eliminates other waste streams, thus minimizing the number of waste streams requiring disposal, (6) minimizes the materiel and labor required for maintenance, and (7) reduces the size of water de-oiling equipment in most operations.

In my process, the evaporator, such as a mechanical vapor recompression or forced circulation type evaporator, is designed to produce high quality distillate (typically 2–5 ppm non-volatile TDS) which can be fed directly into hardness removal equipment (i.e. the electrodeionization system), following adjustment of the distillate temperature to acceptable levels (typically by cooling to about 45° C., or lower). The water product produced by the hardness removal system is used as feedwater for the packaged boiler. Ideally, the produced waters fed to the evaporator are heated by recovering the heat transferred out of the distillate stream. A typical boiler feed water chemistry specification is presented in FIG. 5. Also, in those cases where the EDI system is utilized for hardness removal, the EDI reject stream is recycled to the evaporator feed system, for reprocessing in the evaporator.

The blowdown from the evaporator is often suitable for disposal by deep well injection. Alternately, the blowdown stream can be further concentrated and/or crystallized using a crystallizing evaporator, or a crystallizer, in order to provide a zero liquid discharge type operation. This is an important advantage, since zero liquid discharge operations may be required if the geological formation is too tight to allow water disposal by deep well injection, or if regulatory requirements do not permit deep well injection.

Operating Modes for Mechanical Vapor Recompression Evaporation

Most produced waters encountered in heavy oil production are high in silica, with typical values ranging up to about 200 mg/l as SiO2, or higher. In order to minimize the capital cost of the mechanical vapor recompression (MVR) evaporation system, and while simultaneously providing a process design which prevents the scaling of the heat transfer surfaces with the ever-present silica, operation of the MVR evaporator at high pH, i.e., in preferably excess of about 10.5 is undertaken. More preferably, operation in the range from about 11 to about 12, or higher in appropriate cases, can be used to keep the silica in aqueous solution. This is important, since silica solubility must be accounted for in the design and operation of the MVR evaporator, in order to prevent silica scaling of the heat transfer surfaces. The solubility characteristics of silica are shown in FIG. 6. Since the high pH operation assures increased silica solubility, a concentration factor for the MVR evaporator can be selected so that silica solubility is not exceeded. Operation at high pH, which may be achieved through sodium hydroxide addition, also allows the use of low cost heat transfer and brine wetted surfaces, thus minimizing the capital cost of the system.

Since the calcium hardness and sulfate concentrations of many produced waters is low (typically 20–50 ppm Ca as CaCO3), in many cases it is also possible to operate the MVR evaporators below the solubility limit of calcium sulfate, with proper attention to feedwater quality and to pre-treatment processes. However, if the produced water contains an appreciable amount of calcium and sulfate, the mechanical vapor recompression evaporator can also be operated using a calcium sulfate seeded-slurry technique, even at the high pH of operation. That mode of operation can be made possible by the substantial elimination of carbonate alkalinity, such as by the addition of sulfuric acid, before the feedwater is introduced into the MVR evaporator. To allow the evaporator to be constructed with low cost materials of construction, the pH can be controlled between about 11 and about 12, while operating the MVR evaporator in the seeded-slurry mode.

Operation of the MVR Evaporator in the Seeded-slurry Mode

Prior to the initial startup of the MVR evaporator in the seeded-slurry mode, the evaporator, which is provided in a falling-film, mechanical vapor recompression configuration, the fluid contents of the unit are "seeded" by the addition of calcium sulfate (gypsum). The circulating solids within the brine slurry serve as nucleation sites for subsequent precipitation of calcium sulfate, as well as silica. Such substances both are precipitated as an entering feedwater is concentrated. Importantly, the continued concentrating process produces additional quantities of the precipitated species, and thus creates a continuing source of new "seed" material as these particles are broken up by the mechanical agitation, particularly by the action of the recirculation pump.

Figure 7:
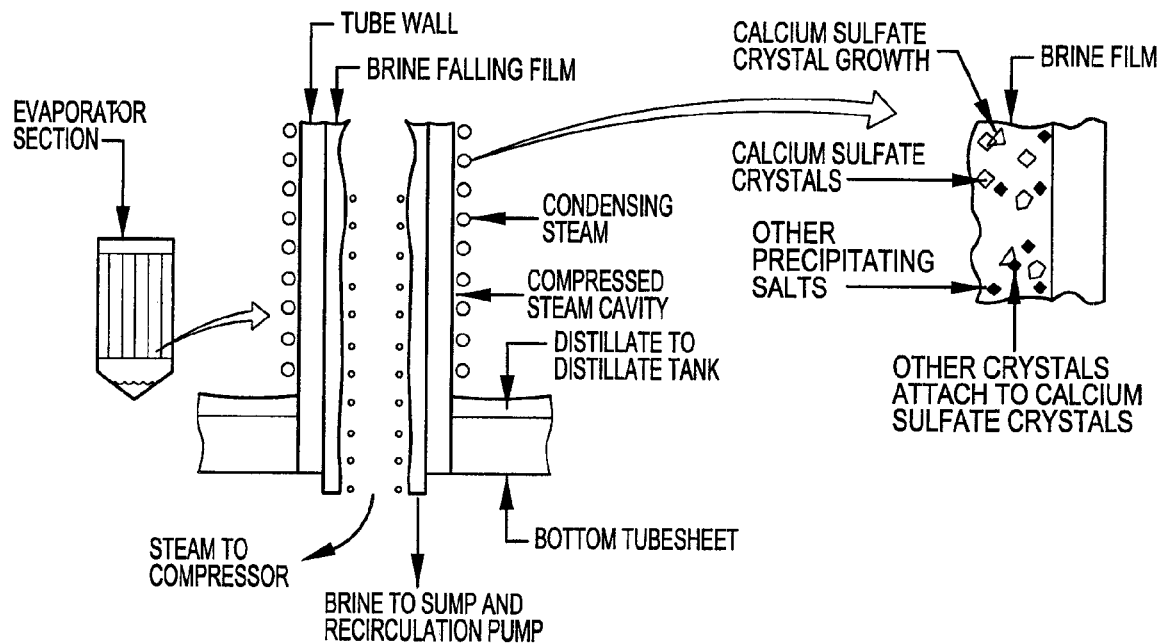
FIG. 7 diagrammatically illustrates a seeded-slurry scale prevention mechanism that has been previously used at neutral or near neutral pH in the evaporation of waters containing calcium sulfate and silica.

In order to avoid silica and calcium sulfate scale buildup in the evaporator, calcium sulfate seed crystals are continuously circulated over the wetted surfaces, such as the interior of the falling film evaporator tubes, as well as other wetted surfaces in the evaporator. Through control of slurry concentration, seed characteristics, and system geometry, the evaporator can operate in the otherwise scale-forming environment. The thermochemical operation within the evaporator with regard to the scale prevention mechanism is depicted in FIG. 7. As the water is evaporated from the brine film inside the tubes, the remaining brine film becomes super-saturated and calcium sulfate and silica start to precipitate. The precipitating material promotes crystal growth in the slurry rather than new nucleation that would deposit on the heat-transfer surfaces; the silica crystals attach themselves to the calcium sulfate crystals. This scale prevention mechanism, called preferential precipitation, has a proven capability to promote clean heat-transfer surfaces. The details of one advantageous method for maintaining adequate seed crystals in preferentially precipitation systems is set forth in U.S. Pat. No. 4,618,429, issued Oct. 21, 1986 to Howard R. Herrigel, the disclosure of which is incorporated into this application in full by this reference.

It is to be appreciated that my water treatment process for preparing boiler feedwater in heavy oil recovery operations is an appreciable improvement in the state of the art of water treatment for oil recovery operations. The process eliminates numerous of the heretofore encountered waste streams, while processing water in reliable mechanical vapor compression evaporators and electrodeionization equipment. The process thus improves on currently used treatment methods by eliminating treatment chemicals, eliminating waste streams, eliminating some types of equipment and thus the complexity associated with a high number of treatment steps involving different unit operations.

In my improved water treatment method, the control over waste streams is focused on a the evaporator blowdown, which can be conveniently treated by deep well injection, or in a zero discharge system such as a crystallizer and/or spray dryer, to reduce all remaining liquids to dryness. This contrasts sharply with the prior art processes, in which sludge from a lime softener is generated, and in which waste solids are gathered at a filter unit, and in which liquid wastes are generated at an ion exchange system and in the steam generators. Moreover, my waste water treatment process also reduces the chemical handling requirements associated with water treatment operations.

Although only one exemplary embodiment of this invention has been described in detail, it will be readily apparent to those skilled in the art that my novel produced waster treatment process, and the apparatus for implementing the process, may be modified from the exact embodiments provided herein, without materially departing from the novel teachings and advantages provided by this invention, and may be embodied in other specific forms without departing from the spirit or essential characteristics thereof. Therefore, the disclosures presented herein are to be considered in all respects as illustrative and not restrictive. As such, any claims are intended to cover the processes described herein, as well as legally equivalent processes. Thus, the scope of the invention is intended to include all variations described herein, whether in the specification or in the drawing, including the broad meaning and range properly afforded to the language and description set forth herein to describe such variations.

It will thus be seen that the objects set forth above, including those made apparent from the preceding description, are efficiently attained. Since certain changes may be made in carrying out the water treatment process according to the teachings herein, it is to be understood that my invention may be embodied in other specific forms without departing from the spirit or essential characteristics thereof. Many other embodiments are also feasible to attain advantageous results utilizing the principles disclosed herein. Therefore, it will be understood that the foregoing description of representative embodiments of the invention have been presented only for purposes of illustration and for providing an understanding of the invention, and it is not intended to be exhaustive or restrictive, or to limit the invention only to the precise forms disclosed.

All of the features disclosed in this specification (including any accompanying claims, and the drawing) may be combined in any combination, except combinations where at least some of the features are mutually exclusive. Alternative features serving the same or similar purpose may replace each feature disclosed in this specification (including any accompanying claims, and the drawing), unless expressly stated otherwise. Thus, each feature disclosed is only one example of a generic series of equivalent or similar features. Further, while certain process steps are described for the purpose of enabling the reader to make and use certain water treatment processes shown, such suggestions shall not serve in any way to limit the claims to the exact variation disclosed, and it is to be understood that other variations, including various treatment additives or alkalinity removal techniques, may be utilized in the practice of my method.

The intention is to cover all modifications, equivalents, and alternatives falling within the scope and spirit of the invention, as expressed herein above and in any appended claims. The scope of the invention, as described herein and as indicated by any appended claims, is thus intended to include variations from the embodiments provided which are nevertheless described by the broad meaning and range properly afforded to the language of the claims, as explained by and in light of the terms included herein, or the equivalents thereof.

What is claimed is:

1. A method of producing steam for downhole injection in the recovery of heavy oil, said method comprising:
    (a) providing an oil and water mixture gathered from an oil and water collection well;
    (b) substantially separating oil from said oil and water mixture to produce (i) an oil product, and (ii) produced water having residual oil therein;
    (c) de-oiling said produced water to at least partially provide an evaporator feedwater, said evaporator feedwater comprising water, dissolved solutes, and dissolved gases, said dissolved solutes comprising silica;
    (d) heating said evaporator feedwater to remove at least some of said dissolved gases;
    (e) injecting said heated evaporator feedwater into a circulating concentrated brine in an evaporator; said evaporator having a plurality of heat transfer surfaces;
    (f) raising the pH of said concentrated brine to maintain solubility of silica in said concentrated brine;
    (g) distributing said concentrated brine on a first surface of at least one of said plurality of heat transfer surfaces to generate a steam vapor and further concentrating said circulating concentrated brine;
    (h) discharging at least some of said concentrated brine as an evaporator blowdown stream;
    (i) compressing said steam vapor to produce a compressed steam vapor;
    (j) directing said compressed steam vapor to a second surface of at least one of said plurality of heat transfer surfaces to condense said compressed steam vapor to form a distillate having residual solutes therein;
    (k) collecting said distillate;
    (l) removing said residual solutes from said distillate via electrodeionization treatment or via ion exchange treatment to produce (a) a substantially solute free distillate stream and (b) a solute containing reject stream;
    (m) introducing said distillate stream into a boiler, to produce
        (i) steam,
        (ii) a boiler blowdown stream, said boiler blowdown stream comprising water and residual dissolved solids,
        (iii) adding said boiler blowdown stream to said evaporator feedwater prior to the step of heating said evaporator feedwater.

2. The method as set forth in claim 1, wherein said evaporator feedwater further comprises at least some alkalinity, further comprising the step, prior to step (d), of lowering the pH of said evaporator feedwater by the addition of acid thereto, so as to produce at least some free carbon dioxide and to produce a pH adjusted evaporator feedwater in order to remove at least some alkalinity from said evaporator feedwater.

3. The process as set forth in claim 2, wherein said acid is sulfuric acid.

4. The method as set forth in claim 1, further comprising the step of cooling said distillate prior to introducing of said distillate to said electrodeionization or ion-exchange system.

5. The method as set forth in claim 4, wherein said method further comprises the step of heating said substantially solute free boiler feedwater stream before introducing said boiler feedwater stream into said boiler.

6. The process as set forth in claim 1, or in claim 4, wherein said evaporator feedwater further comprises calcium, and wherein a slurry comprising said concentrated brine and calcium seed crystals is maintained for precipitation of said calcium to said calcium seed crystals rather than to said heat transfer surfaces of said evaporator.

7. The process as set forth in claim 1, wherein during the step of concentrating said circulating concentrated brine, the pH of said concentrated brine circulating in said evaporator is maintained to at least 10.5.

8. The process as set forth in claim 7,
wherein the pH is maintained by the addition of sodium hydroxide.

9. The process as set forth in claim 1, wherein during the step of concentrating said circulating concentrated brine, the pH of said concentrated brine circulating in said evaporator is maintained to between about 11 and about 12.

10. The process as set forth in claim 1, wherein during the step of concentrating said circulating concentrated brine, the pH of said concentrated brine circulating in said evaporator is maintained to 12 or above.

11. The process as set forth in claim 1, wherein said evaporator is a falling-film evaporator.

12. The process as set forth in claim 1, wherein said evaporator is a forced-circulation evaporator.

13. The process as set forth in claim 11 or in claim 12, wherein said plurality of heat transfer surfaces are tubular.

14. The process as set forth in claim 13, wherein said evaporator feedwater is concentrated in the interior of said tubes.

15. The process as set forth in claim 11 or in claim 12, wherein said evaporator comprises a mechanical vapor recompression evaporator.

16. The process as set forth in claim 1, wherein said solute containing reject stream is from electrodeionization treatment, and wherein said treatment further comprises the step of returning said solute containing reject stream to said evaporator feedwater prior to step (d).

17. The process as set forth in claim 1, further comprising the step of injecting said evaporator blowdown in a deep-well.

18. The process as set forth in claim 1, further comprising the step of treating said evaporator blowdown stream in a zero discharge crystallizer system.

19. The process as set forth in claim 1, further comprising the step of treating said evaporator blowdown stream in a spray dryer to dry solids in said evaporator blowdown stream.

20. The process as set forth in claim 1, further comprising, before step (d), the step of removing oil from said evaporator feedwater stream.

21. The process as set forth in claim 20, wherein the concentration of oil in said evaporator feedwater stream comprises less than about twenty parts per million.

22. The process as set forth in claim 1, wherein said boiler comprises a packaged boiler.

23. The process as set forth in claim 1, wherein said boiler comprises a once-through steam generator.

24. The process as set forth in claim 23, wherein said once-through steam generator produces about 80% quality steam.

25. The process as set forth in claim 23, further comprising, after said once through steam generator, the step of separating steam and liquid from said 80% quality steam, to produce a steam stream having substantially 100% quality.

26. The process as set forth in claim 25, wherein said 100% steam quality stream is injected via injection wells to fluidize heavy oil.

27. A method of producing steam for downhole injection in the recovery of heavy oil, said method comprising:
(a) providing an oil and water mixture gathered from an oil and water collection well;
(b) substantially separating oil from said oil and water mixture to provide (i) an oil product, and (ii) produced water having residual oil therein;
(c) de-oiling said produced water to at least partially provide an evaporator feedwater, said evaporator feedwater comprising water, dissolved solutes, and dissolved gases, said dissolved solutes comprising silica;
(d) heating said evaporator feedwater to remove at least some of said dissolved gases;
(e) injecting said evaporator feedwater into a concentrated brine in an evaporator; said evaporator having a plurality of heat transfer surfaces;
(f) raising the pH of said concentrated brine as necessary to maintain solubility of silica in said concentrated brine;
(g) distributing said concentrated brine on a first surface of at least one of said plurality of heat transfer surfaces to generate a steam vapor;
(h) discharging at least some of said concentrated brine as an evaporator blowdown stream;
(i) compressing said steam vapor to produce a compressed steam vapor;
(j) directing said compressed steam vapor to a second surface of at least one of said plurality of heat transfer surfaces to condense said compressed steam vapor to form a distillate having residual solutes therein;
(k) collecting said distillate;
(l) removing said residual solutes from said distillate via electrodeionization treatment or via ion exchange treatment to produce (a) a substantially solute free distillate stream and (b) a solute containing reject stream;
(m) introducing said distillate stream into a boiler, to produce
(i) steam,
(ii) a boiler blowdown stream, said boiler blowdown stream comprising water and residual dissolved solids,
(iii) adding said boiler blowdown stream to said evaporator feedwater prior to the step of heating said evaporator feedwater;
(n) injecting said steam in an injection well to produce an oil and water mixture;
(o) gathering said oil and water mixture.

* * * * *